United States Patent [19]

Suzuki

[11] Patent Number: 4,559,254

[45] Date of Patent: Dec. 17, 1985

[54] RESIN MATERIAL IN SHEET FORM

[75] Inventor: Hirosuke Suzuki, Tokorozawa, Japan

[73] Assignee: Junkosha Company Ltd., Tokyo, Japan

[21] Appl. No.: 374,674

[22] Filed: May 4, 1982

[51] Int. Cl.$^4$ .............................................. B32B 3/24
[52] U.S. Cl. ................................... 428/131; 428/136; 428/167; 428/304.4; 428/422
[58] Field of Search ............... 428/131, 421, 422, 910, 428/134–136, 167, 304.4

[56] References Cited

U.S. PATENT DOCUMENTS

| | | | |
|---|---|---|---|
| 691,804 | 1/1902 | Parker | 428/131 X |
| 4,207,375 | 6/1980 | Kim et al. | 428/910 X |
| 4,229,473 | 10/1980 | Elber | 428/113 |
| 4,303,714 | 12/1981 | Mercer | 428/135 |

FOREIGN PATENT DOCUMENTS 2376091  9/1978  France ................. 428/422

Primary Examiner—Alexander S. Thomas
Attorney, Agent, or Firm—Mortenson & Uebler

[57] ABSTRACT

A sheet of porous resinous material, particularly polytetrafluoroethylene, having a multiplicity of holes formed therethrough. The holes are provided in a plurality of rows extending along the length of the sheet. The sheet has a smaller thickness in the area extending along each row of holes than in its remaining portions.

10 Claims, 2 Drawing Figures

RESIN MATERIAL IN SHEET FORM

BACKGROUND OF THE INVENTION

1. Field of the Invention

This invention relates to a sheet of porous resinous material.

2. Description of the Prior Art

Porous resinous material, such as porous polytetrafluoroethylene, is usually employed in various kinds of electrical apparatus because of its excellent properties, including a low dielectric constant. There are, however, limitations to the dielectric constant and other properties of the porous resinous material known in the art, and therefore, to the scope of it applications.

SUMMARY OF THE INVENTION

As a result of his extensive research, the inventor of this invention has discovered that a sheet of porous resinous material provided therethrough with a multiplicity of holes has a lower dielectric constant than the known material. He has also found that those holes facilitate the movement of a fluid, can retain an adhesive therein when it is necessary to join a plurality of sheets with an improved adhesive strength, and can contain other material therein to provide a composite material having different properties.

It is, therefore, an object of this invention to provide a sheet of porous resinous material which can be used for a wider variety of applications than the known material.

According to this invention, there is, thus, provided a sheet of porous resinous material having a multiplicity of holes formed therethrough. The various advantages which may result from the provision of those holes as hereinabove set forth make the sheet of this invention suitable for use in a wide variety of applications. It is not only appropriate for use in electrical insulation, but can also be used in sensors, buffer material, heat insulation and lamination.

DETAILED DESCRIPTION OF THE INVENTION

According to this invention, it is preferable to use a fluororesin in order to obtain a sheet having outstanding electrical, chemical and physical properties. As a fluororesin is a liquid-repellent, a liquid can pass through the holes in the sheet only when its pressure is higher than a certain level. In other words, there is obtained a selectively liquid-permeable sheet having a wider scope of uses.

Another feature of this invention resides in the stretching of the resinous material around the holes with a resultant reduction in the thickness of the sheet in the areas around the holes. If a plurality of sheets thus manufactured are laminated on each other, a large space occupied by air is created between the sheets, and sharply lowers the dielectric constant of the laminated sheets.

The invention will now be described more specifically by way of example with reference to the drawings.

Figure 1:
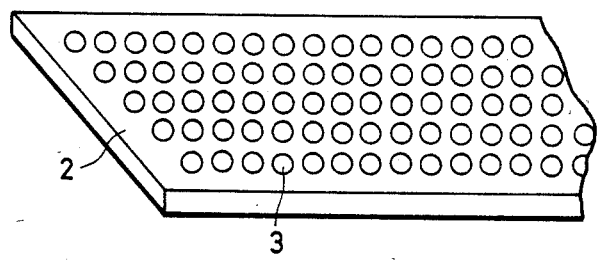
FIG. 1 is a partial perspective view of a sheet of resinous material embodying this invention.

Referring first to FIG. 1, there is shown a sheet of resinous material 1 embodying this invention, and manufactured as will hereunder be set forth. A tape of unbaked polytetrafluoroethylene (PTFE) in which the resin had been oriented longitudinally was held for five minutes in air heated to 300° C. and having a pressure of 1 atm. The tape was stretched in one second to three times as long as its original length. Then, the tape was held for two minutes in air heated to 330° C. and having a pressure of 1 atm., while it was maintained in its stretched position. The tape was, thus, thermally set to yield a sheet 2 of stretched, continuously porous resin having a width of 150 mm, a stretched length of 1000 m and a thickness of 0.1 mm. Then, the sheet 2 was formed by a customary method with a multiplicity of holes 3 having a diameter of 0.6 mm, and positioned on 1 mm centers to define what looks like a grid, as shown in FIG. 1.

The holes 3 do not always need to be circular, but may be of various other shapes. Although the sheet 2 was prepared from a stretched and baked tape by way of example, it is also possible to use an unstretched and unbaked porous tape, a stretched and unbaked tape, an unstretched and baked tape, or the like. After the sheet 2 has been formed with the holes 3, it is possible to set it thermally and/or stretch it.

The sheet 1 manufactured as hereinabove described showed a dielectric constant of 1.2 which had never been achieved by any porous PTFE known in the art. The sheet also showed a dielectric dissipation factor as low as $3 \times 10^{-5}$ at 1 GHz. In addition to these improved electrical properties, the sheet 1 was found to provide various advantages. It solves the low adhesive property of PTFE. The holes 3 allow a fluid to pass through the sheet. The holes can hold another material therein to provide a composite sheet.

Figure 2:
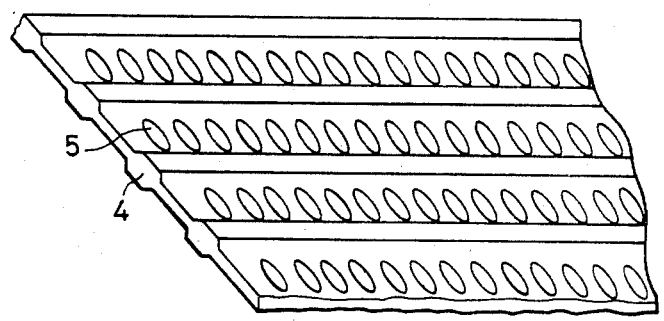
FIG. 2 is a partial perspective view of another sheet embodying this invention.

Referring now to FIG. 2, there is shown a modified form of the sheet according to this invention. The sheet 6 shown in FIG. 2 is obtained if the sheet shown in FIG. 1 is stretched in a direction perpendicular to its length, so that only the resinous material extending along each row of holes 5 may be stretched, while the solid area between every adjoining rows of holes 5 is not stretched, but retains the original tape thickness. The holes 5 are oval. Every two adjoining solid areas 4 define therebetween a groove having a generally U-shaped cross section on each side of the sheet 6. If a plurality of sheets 6 are laminated on each other, a large space occupied by air is defined between the sheets, and contributes to lowering their dielectric constant. The sheet 6 showed a dielectric constant as low as 1.15, and a dielectric dissipation factor (tan δ) of $2 \times 10^{-5}$ at 1 GHz.

It is possible to obtain the same result if the resinous material extending along each row of holes is stretched longitudinally of the sheet.

Although the invention has been described with reference to the preferred embodiments thereof, it is to be understood that modifications or variations may be easily made by anybody of oridinary skill in the art without departing from the scope of this invention which is defined by the appended claims. For example, it is advantageous to incorporate a coloring agent, $TiO_2$.$Al_2O_3$, electrcially conductive carbon, a catalyst, or any other filler into the resinous material, depending on the purpose for which the sheet is used.

What is claimed is:

1. A dielectric comprising a sheet of continuously porous polytetrafluoroethylene material having, in addition to the pores of the porous material, a multiplicity of holes formed therethrough.

2. The dielectric of claim 1 wherein said holes are provided in a plurality of rows extending along the length of said sheet.

3. The dielectric of claim 2 wherein said sheet has a smaller thickness in the region extending along each row of holes than in its remaining portions.

4. The dielectric of claim 1 wherein said holes are provided in a plurality of rows extending transversely across said sheet.

5. The dielectric of claim 4 wherein said sheet has a smaller thickness in the region extending along each row of holes than in its remaining portions.

6. The dielectric of claim 1 containing a filler.

7. The dielectric of claim 6 wherein said filler is a coloring agent.

8. The dielectric of claim 6 wherein said filler is $TiO_2 \cdot Al_2O_3$.

9. The dielectric of claim 6 wherein said filler is electrically conductive carbon.

10. The dielectric of claim 6 wherein said filler is a catalyst.

* * * * *